United States Patent
Yamada et al.

(10) Patent No.: US 9,470,856 B2
(45) Date of Patent: Oct. 18, 2016

(54) METHOD OF MANUFACTURING PHOTOELECTRIC COMPOSITE SUBSTRATE

(71) Applicant: FUJITSU LIMITED, Kawasaki-shi, Kanagawa (JP)

(72) Inventors: Tetsuro Yamada, Kawasaki (JP); Akiko Matsui, Meguro (JP); Yoshiyuki Hiroshima, Nakano (JP); Takahiro Ooi, Kawasaki (JP); Kohei Choraku, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/029,838

(22) Filed: Sep. 18, 2013

(65) Prior Publication Data

US 2014/0170784 A1  Jun. 19, 2014

(30) Foreign Application Priority Data

Dec. 14, 2012  (JP) ................................ 2012-273649

(51) Int. Cl.
*H01L 33/58* (2010.01)
*H01L 31/0232* (2014.01)
*G02B 6/42* (2006.01)
*G02B 6/43* (2006.01)

(52) U.S. Cl.
CPC ........... *G02B 6/4245* (2013.01); *G02B 6/4214* (2013.01); *G02B 6/4239* (2013.01); *G02B 6/43* (2013.01)

(58) Field of Classification Search
CPC .................. H01L 2924/01079; H05K 3/303; G02B 6/4239; G02B 6/4245; G02B 6/4214
USPC ............................................................ 438/15
See application file for complete search history.

(56) References Cited

U.S. PATENT DOCUMENTS

| | | | |
|---|---|---|---|
| 6,525,944 B1 * | 2/2003 | Li | H01L 24/73 257/E31.117 |
| 8,606,057 B1 * | 12/2013 | Rudmann et al. | 385/14 |
| 2005/0248822 A1 | 11/2005 | Tohgoh et al. | |
| 2010/0027947 A1 * | 2/2010 | Dutta | 385/88 |
| 2011/0108716 A1 * | 5/2011 | Shiraishi | 250/227.24 |

FOREIGN PATENT DOCUMENTS

| | | |
|---|---|---|
| JP | H02-058005 A | 2/1990 |
| JP | H11-352362 A | 12/1999 |
| JP | 2000-332301 A | 11/2000 |
| JP | 2004-085756 A | 3/2004 |
| JP | 2007-004101 A | 1/2007 |

OTHER PUBLICATIONS

Japanese Office Action dated Jul. 5, 2016, issued in corresponding JP Application No. 2012-273649.

* cited by examiner

*Primary Examiner* — Duy T Nguyen
*Assistant Examiner* — Mounir Amer
(74) *Attorney, Agent, or Firm* — Squire Patton Boggs (US LLP)

(57) ABSTRACT

A method of manufacturing a photoelectric composite substrate, includes: aligning and fixing an optical element having a solder terminal to an optical waveguide for forming a path of an optical signal on a printed circuit board; mounting the optical waveguide, to which the optical element is fixed, on the printed circuit board; and welding the solder terminal to an electrode of a package installed on the printed circuit board or an electrode of the printed circuit board.

5 Claims, 8 Drawing Sheets

METHOD OF MANUFACTURING PHOTOELECTRIC COMPOSITE SUBSTRATE

CROSS-REFERENCE TO RELATED APPLICATION

This application is based upon and claims the benefit of priority from the prior Japanese Patent Application No. 2012-273649 filed on Dec. 14, 2012, the entire contents of which are incorporated herein by reference.

FIELD

The embodiments discussed herein are related to a method of manufacturing a photoelectric composite substrate.

BACKGROUND

The operating speed of electronic devices such as a computer continues to increase.

For this reason, in recent years, as described, for example, in Japanese Laid-open Patent Publication No. 2000-332301, development of a photoelectrical composite substrate is being advanced for achieving communication between LSI or IC chips included in the electronic devices, by using optical signals. In a telecommunication field such as Internet, communication using optical signals is performed as described, for example, in Japanese Laid-open Patent Publication No. 2004-85756.

When a photoelectric composite substrate is manufactured, for example, a drive element which drives an optical element and a package equipped with the optical element are prepared beforehand. The package is then mounted on a printed circuit board with the position of the optical element aligned with the position of an optical waveguide mounted on the printed circuit board. The package is mounted on the printed circuit board via an electrical connector such as a solder ball.

When an electrical connector such as a solder ball has an electrical contact, an electrical signal may be transmitted therethrough. On the other hand, when an optical axis is not at a predetermined position, the connecting part between the optical element and the optical waveguide does not allow an optical signal to be transmitted. Thus, the positional precision demanded for the connecting part between the optical element and the optical waveguide is higher than the positional precision demanded for the electrical connector such as a solder ball. However, when the package equipped with the optical element is mounted on the printed circuit board, connection failure may occur between the optical element and the optical waveguide because of inevitable positional displacement therebetween caused by heat deformation or the like at the time of reflow.

Thus, it is an object of the present application to provide a method of manufacturing a photoelectric composite substrate, the method enabling relative positional precision between the optical element and the optical waveguide to be improved.

SUMMARY

According to an aspect of the invention, a method of manufacturing a photoelectric composite substrate, includes: aligning and fixing an optical element having a solder terminal to an optical waveguide for forming a path of an optical signal on a printed circuit board; mounting the optical waveguide, to which the optical element is fixed, on the printed circuit board; and welding the solder terminal to an electrode of a package installed on the printed circuit board or an electrode of the printed circuit board.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment will be described. The embodiment illustrated below is just an example and does not limit the technical scope of the method disclosed in the present application of manufacturing a photoelectric composite substrate.

[Embodiment of Method of Manufacturing Photoelectric Composite Substrate]

Figure 1:
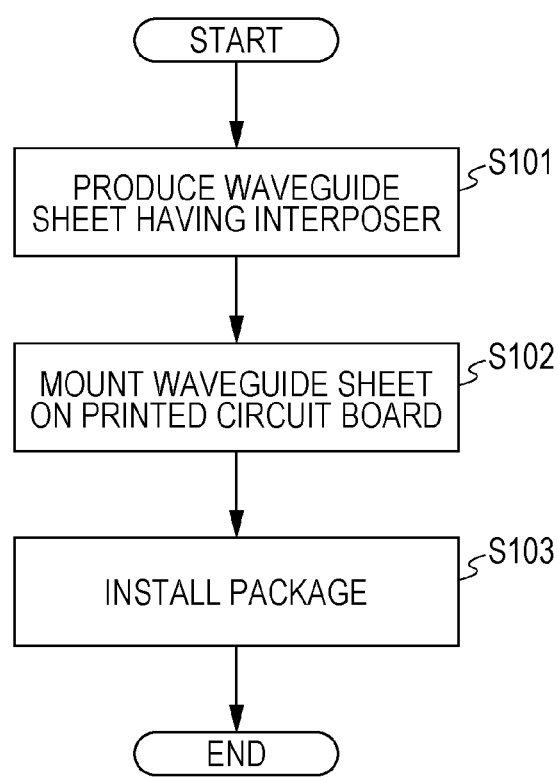
FIG. 1 is an example of a process flow diagram of a method of manufacturing a photoelectric composite substrate.

FIG. 1 is an example of a process flow diagram of a method of manufacturing a photoelectric composite substrate. Hereinafter, the method of manufacturing a photoelectric composite substrate according to the embodiment will be described with reference to the process flow diagram of FIG. 1.

Figure 2:
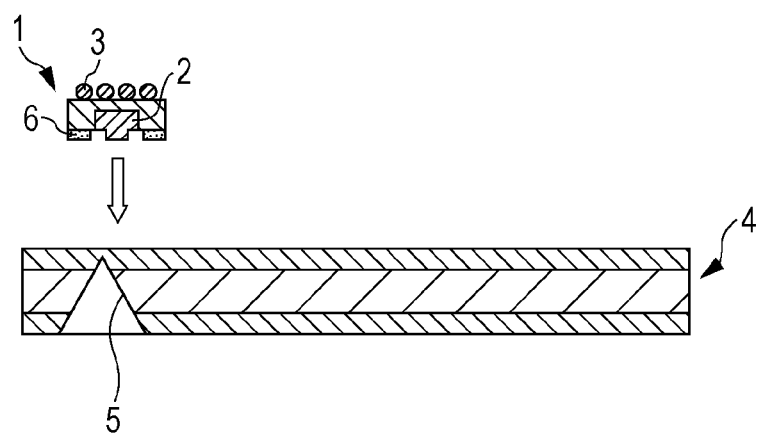
FIG. 2 is an example of a diagram illustrating a step of fixing an optical element having solder balls to an optical waveguide.

In the present embodiment, an optical element having solder terminals is first aligned and fixed to an optical waveguide for forming a path of an optical signal on a printed circuit board (S101). FIG. 2 is an example of a diagram illustrating a step of fixing the optical element having solder balls (examples of the "solder terminal" in the present application) to the optical waveguide.

When an optical element having solder terminals is aligned and fixed to an optical waveguide for forming a path of an optical signal on a printed circuit board, for example, an interposer 1 as illustrated in FIG. 2 is prepared beforehand. The interposer 1 is a component in which an optical element 2 is provided with solder balls 3 for electrically connecting the optical element 2 to an electrode of a package installed on a printed circuit board or an electrode of the printed circuit board. The interposer 1 may be in a form of chip size package (CSP) or wafer level package (WLP) as illustrated in FIG. 2 or may be in another form.

When the optical element 2 is fixed to an optical waveguide 4, the optical element 2 is aligned by moving the interposer 1 so that the optical axis of the optical element 2 intersects a mirror 5 of the optical waveguide 4. This alignment may be achieved in a highly precise manner, for example, by using a guide such as a hole, a pin or a mark previously formed in the optical waveguide 4, using an optical microscope, or seeing through the optical waveguide 4 from the side of the interposer 1 opposite to the side where the optical element 2 is disposed. After the alignment is made, the optical element 2 is fixed to the optical waveguide 4. The optical element 2 is fixed using a material 6 such as resin or adhesive which has been applied to the interposer 1. When light curing resin such as an ultraviolet ray curing resin is used as the material 6, the resin may be cured by light with the alignment made, and thus the optical element 2 may be fixed with the highly precise alignment. A waveguide passage sheet with an interposer is completed by fixing the optical element 2 to the optical guide 4.

Figure 3:
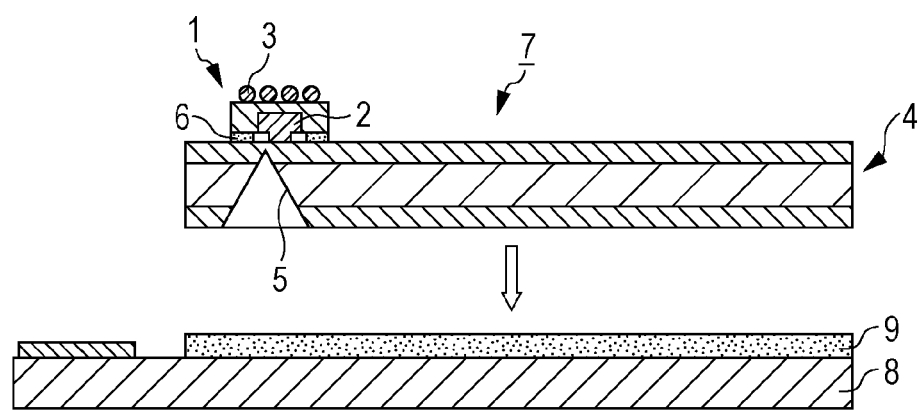
FIG. 3 is an example of a diagram illustrating a step of mounting a waveguide sheet having an interposer to a printed circuit board.

After the optical element having solder terminals is fixed to the optical waveguide, the optical waveguide, to which the optical element is fixed, is mounted on the printed circuit board (S102). FIG. 3 is an example of a diagram illustrating a step of mounting a waveguide sheet having an interposer 7 to a printed circuit board 8. For example, the waveguide sheet having an interposer 7 as illustrated in FIG. 3, after being completed, is mounted on the printed circuit board 8. The waveguide sheet having an interposer 7 may be fixed, for example, with an adhesive sheet 9 as illustrated in FIG. 3 or may be fixed by using an adhesive applied to the waveguide sheet having an interposer 7 or the printed circuit board 8. At the time of mounting, alignment may be made using, for example, a guide such as a hole, a pin or a mark previously formed in the printed circuit board 8.

Figure 4:
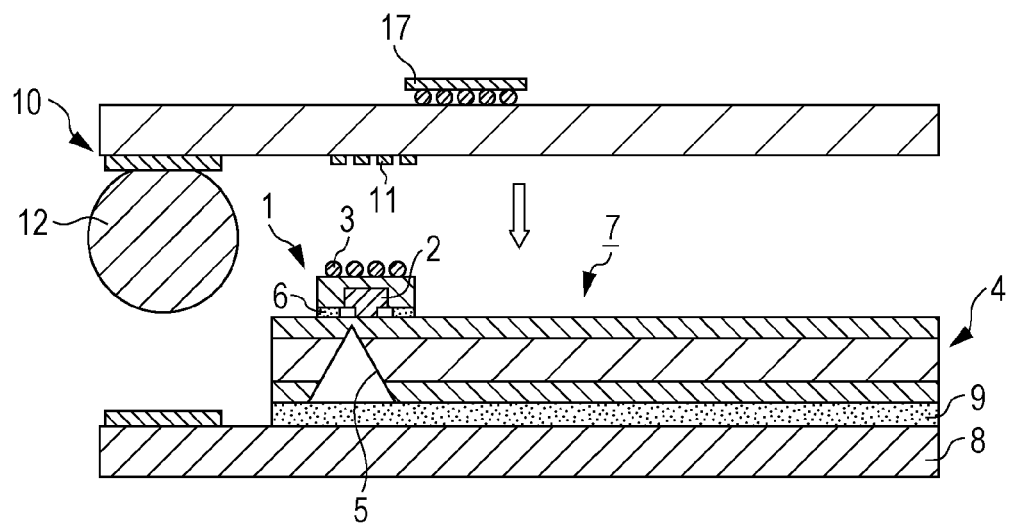
FIG. 4 is an example of a diagram illustrating a step of installing a package.

After the optical waveguide, to which the optical element is fixed, is mounted on the printed circuit board, the solder terminals are welded to the electrode of the package installed on the printed circuit board or the electrode of the printed circuit board (S103). FIG. 4 is an example of a diagram illustrating a step of installing the package. The optical waveguide 4, to which the optical element 2 is fixed, is mounted on the printed circuit board 8 with the interposer 1 the upper side as illustrated in FIG. 4, for example, a package 10 is installed on the printed circuit board 8. The solder balls 3 of the interposer 1 are welded to electrodes 11 of the package 10 which is installed on the printed circuit board 8. The package 10 is a component to be implemented on the printed circuit board 8 so as to cover the optical element 2 of the waveguide sheet having an interposer 7 mounted on the printed circuit board 8. An optical drive element 17, which is a semiconductor device for driving the optical element 2, is installed on the package 10. The optical drive element 17 of the package 10 is electrically connected to the printed circuit board 8 via a solder ball 12.

When the package 10 is mounted on the printed circuit board 8, alignment may be made using a guide such as a hole, a pin or a mark previously formed in the printed circuit board 8 in order to align the solder balls 3 provided in the optical element 2 with corresponding positions of the electrodes 11 of the package 10. In the present embodiment, the package 10 is mounted using the solder ball 12, however, the package 10 may be mounted on the printed circuit board 8 using, for example, an anisotropic conductive film or an anisotropic conductive paste. Loss of optical signals may be reduced by filling the space between the optical element 2 and the optical waveguide 4 with resin, the resin having an approximately the same refractive index as that of the optical waveguide 4. When the space between the optical element 2 and the optical waveguide 4 is filled with resin, the filling may be performed at the same time, for example, when the optical element is aligned and fixed to the optical waveguide. The optical element 2 may be directly welded to the electrodes of the package 10 by soldering. The optical element 2 may determine the amount of embedding into the cladding layer of the optical waveguide 4 based on numerical aperture (NA) of the optical element 2 or the distance between the optical element 2 and the mirror 5.

Figure 5:
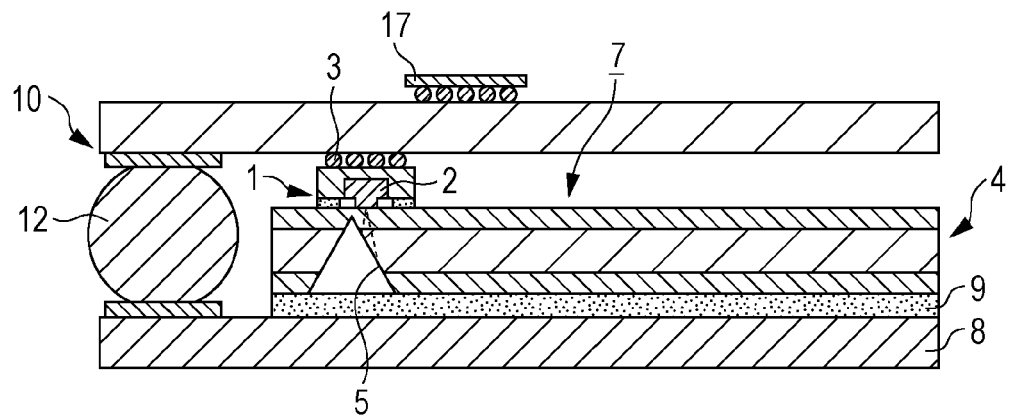
FIG. 5 is a first example of a diagram illustrating the photoelectric composite substrate.

FIG. 5 is a first example of a diagram illustrating the photoelectric composite substrate. In a photoelectric composite substrate 18, various circuits on the printed circuit board 8 electrically connected to the optical drive element 17 through the solder ball 12 may communicate with other circuits via optical signals flowing through the optical waveguide 4.

Figure 6:
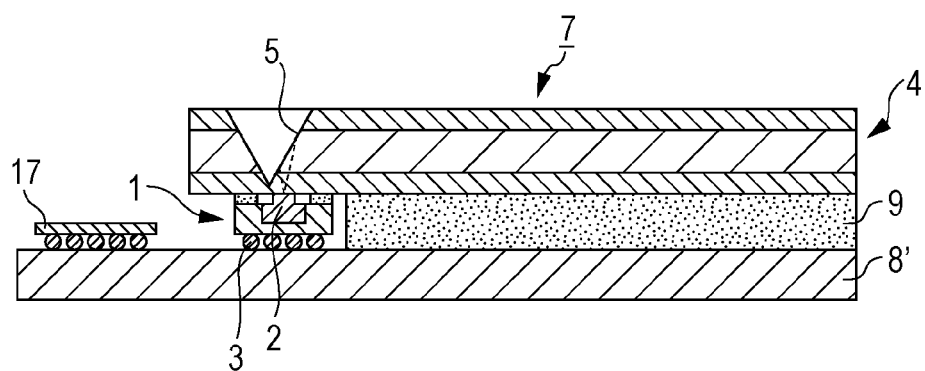
FIG. 6 is a second example of a diagram illustrating the photoelectric composite substrate.

In the method of manufacturing a photoelectric composite substrate according to the embodiment, the optical waveguide 4, to which the optical element 2 is fixed, may be mounted on the printed circuit board with the interposer 1 on the lower side. FIG. 6 is a second example of a diagram illustrating the photoelectric composite substrate. In the method of manufacturing a photoelectric composite substrate according to the second example, the waveguide sheet having an interposer 7 completed in step S101 is mounted, for example, on the printed circuit board 8' with the interposer 1 on the lower side. The waveguide sheet having an interposer 7 may be mounted, for example, using the adhesive sheet 9 illustrated in FIG. 6 or using resin, adhesive or the like. When the waveguide sheet having an interposer 7 is mounted on the printed circuit board 8', alignment may be made using a guide such as a hole, a pin or a mark previously formed in the printed circuit board 8' in order to align the solder balls 3 provided in the optical element 2 with corresponding positions of the electrodes of the printed circuit board 8'.

By the method of manufacturing a photoelectric composite substrate performing a series of steps (S101 to S103) described above, electrical connection of the solder terminals disposed in the optical element is made with the positional relationship between the optical element and the optical waveguide maintained, and thus relative positional precision between the optical element and the optical waveguide is improved. The connection (optical axis alignment) between the optical element and the optical waveguide has prescribed alignment precision much higher than that in the case where the solder terminals and the electrodes are electrically connected. For example, the prescribed precision demanded when the optical element and the optical waveguide are connected is approximately 5 to 10 µm. On the other hand, the prescribed precision demanded when the solder terminals and the electrodes are electrically connected is approximately 50 to 100 µm. That is to say, the prescribed precision demanded when the optical element and the optical waveguide are connected is approximately 10 times the prescribed precision demanded when the solder terminals and the electrodes are electrically connected. However, in the method of manufacturing a photoelectric composite substrate according to the present embodiment, the optical waveguide is mounted on the printed circuit board and the solder terminals disposed on the optical element are welded to the electrodes after the optical element is fixed to the optical waveguide, thus positional displacement between the optical element and the optical waveguide due to thermal deformation or the like does not occur. In addition, there is no possibility that the optical element is soiled by the soldering flux. For this reason, highly precise alignment may be made between the optical element and the optical waveguide, and thus the optical element and the optical waveguide may be favorably connected to each other.

Figure 7:
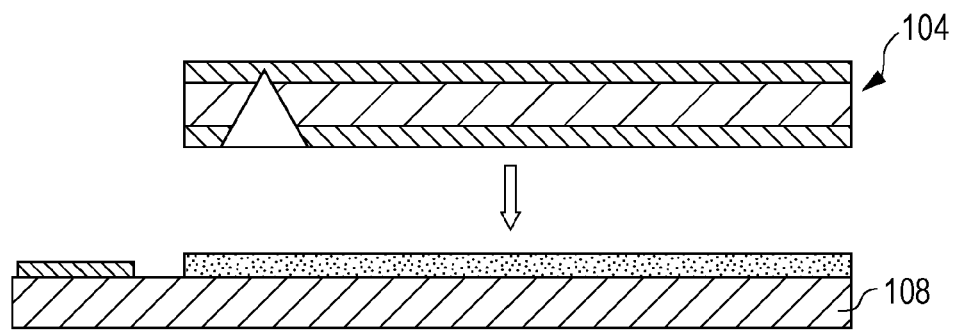
FIG. 7 is an example of a diagram illustrating a step of mounting an optical waveguide to a printed circuit board in a comparative example.

Hereinafter, an example (hereinafter referred to as a "comparative example") of a method of manufacturing a photoelectric composite substrate other than the method of manufacturing a photoelectric composite substrate according to the present embodiment will be described. FIG. 7 is an example of a diagram illustrating a step of mounting an optical waveguide to a printed circuit board in a comparative example. In the comparative example, an optical waveguide 104, which is not provided with an optical element or the like, is mounted on a printed circuit board 108.

Figure 8:
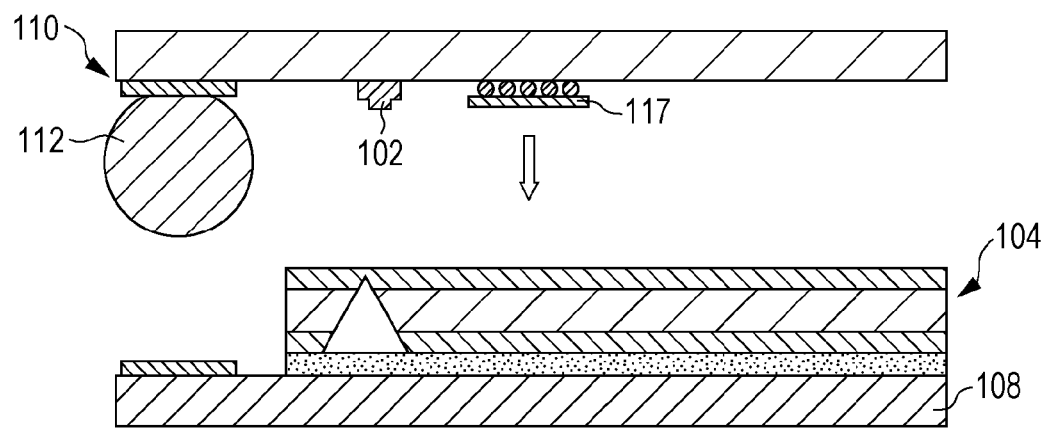
FIG. 8 is an example of a diagram illustrating a step of installing a package, in the comparative example.

FIG. 8 is an example of a diagram illustrating a step of installing a package, in the comparative example. In the comparative example, the optical waveguide 104 is mounted on the printed circuit board 108, then a package 110 equipped with an optical element 102 is installed on the printed circuit board 108. Consequently, the optical drive element 117 of the package 110 is electrically connected to the printed circuit board 108 via a solder ball 112, and the optical element 102 is connected to the optical waveguide 104.

Figure 9:
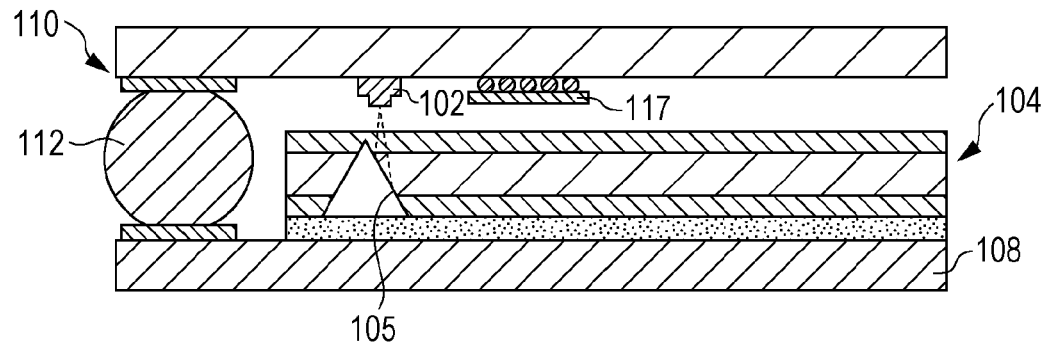
FIG. 9 is a first example of a photoelectric composite substrate manufactured by a method of manufacturing a photoelectric composite substrate, according to the comparative example.

FIG. 9 is a first example of a photoelectric composite substrate manufactured by a method of manufacturing a photoelectric composite substrate, according to the comparative example. For example, when the package 110 equipped with the optical element 102 is mounted on the printed circuit board 108 equipped with the optical waveguide 104, the printed circuit board 108 and the package 110 are deformed by heat caused by reflow or the like. In addition, alignment precision may be reduced due to vibration or the like of a machine which performs the mounting. Thus, even when the package 110 is aligned so that the optical axis of the optical element 102 intersects a mirror 105 of the optical waveguide 104, positional displacement inevitably occurs after the solder ball 112 is welded.

Thus, a solution may be devised to relax the prescribed alignment precision by disposing, for example, a lens between the optical element 102 and the mirror 105 of the optical waveguide 104.

Figure 10:
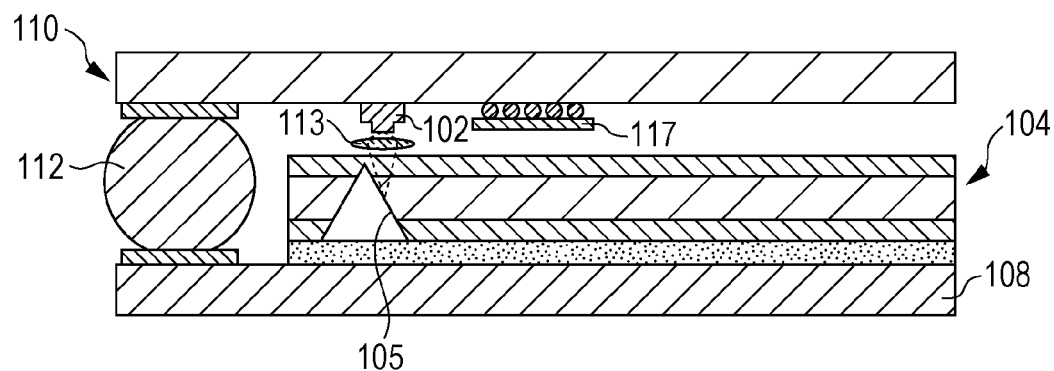
FIG. 10 is a second example of a photoelectric composite substrate manufactured by the method of manufacturing a photoelectric composite substrate, according to the comparative example.

FIG. 10 is a second example of a photoelectric composite substrate manufactured by the method of manufacturing a photoelectric composite substrate, according to the comparative example. When the prescribed alignment precision is desired to be relaxed, for example, a light gathering lens 113 is disposed between the optical element 102 and the mirror 105 of the optical waveguide 104 as illustrated in FIG. 10. When the light gathering lens 113 is disposed, the alignment precision demanded when the optical element 102 and the optical waveguide 104 are connected to each other is approximately 10 to 20 µm, and thus the prescribed alignment precision is relaxed in contrast to the case where the lens 113 is not used.

Figure 11:
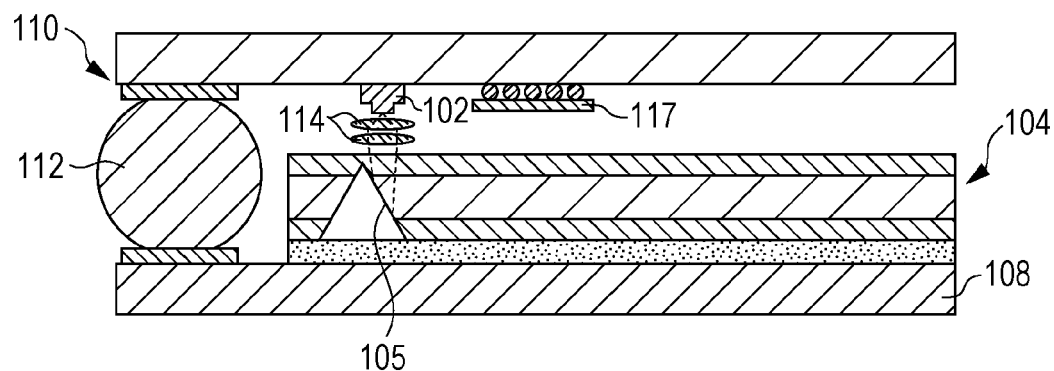
FIG. 11 is a third example of a photoelectric composite substrate manufactured by the method of manufacturing a photoelectric composite substrate, according to the comparative example.

FIG. 11 is a third example of a photoelectric composite substrate manufactured by the method of manufacturing a photoelectric composite substrate, according to the comparative example. When the prescribed alignment precision is desired to be relaxed, for example, a parallel light lens 114 is disposed between the optical element 102 and the mirror 105 of the optical waveguide 104 as illustrated in FIG. 11. When the parallel light lens 114 is disposed, prescribed precision of relative position between opposing lenses is approximately 50 µm, and thus the prescribed alignment precision is relaxed in contrast to the case where the lens 114 is not used.

However, when the light gathering lens 113 is used, the amount of relaxing in the prescribed alignment precision is small. When the parallel light lens 114 is used, the prescribed precision of relative position between the lens 114 and the optical waveguide 104 is still approximately 5 to 10 µm, and thus advantage of relaxed prescribed alignment precision is small in consideration of increased number of components.

On the other hand, by the method of manufacturing a photoelectric composite substrate according to the above-described embodiment, the solder terminals disposed in the optical element are welded after the optical element is fixed to the optical waveguide, and thus the relative position between the optical element and the optical waveguide does not change due to heat deformation caused by reflow or the like at the time of welding solder terminals. For this reason, highly precise alignment may be made between the optical element and the optical waveguide, and thus the number of components may be reduced without using the lens 113, 114.

[Modification of Method of Manufacturing Photoelectric Composite Substrate]

Figure 12:
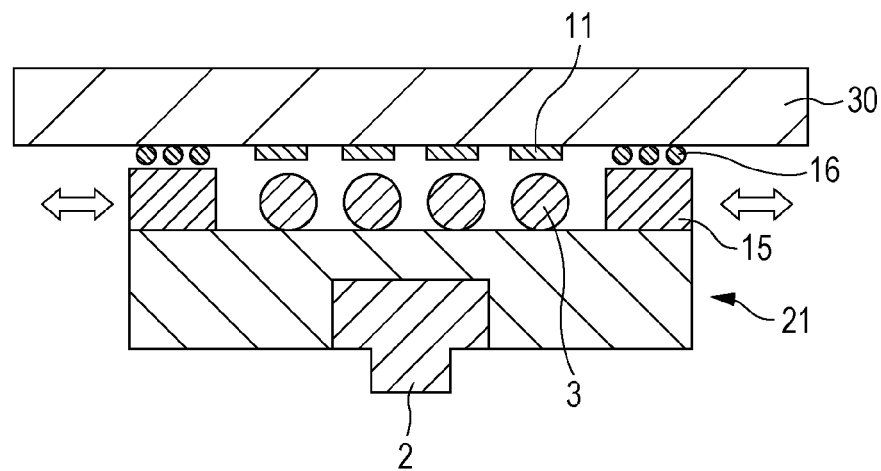
FIG. 12 is an example of a diagram illustrating an interposer and a package which are used in a first modification.

Hereinafter, a first modification of the method of manufacturing a photoelectric composite substrate will be described. In the first modification, a photoelectric composite substrate is manufactured by using an interposer and a package which are illustrated below. FIG. 12 is an example of a diagram illustrating the interposer and the package which are used in the first modification. In an interposer 21 used in the first modification, a position detection member 15 is provided adjacent to the solder balls 3, the position detection member 15 being composed of a conductive material. In a package 30 used in the first modification, a plurality of contact terminals 16 for position detection is provided at positions corresponding to the position detection member 15. Each of the contact terminals 16 may be electrically connected to a detector circuit connected to the package 30 or a detector circuit provided in the package 30. The detector circuit detects presence of electrical connection between each contact terminal 16 and the position detection member 15.

In the first modification, in step S103 of the method of manufacturing a photoelectric composite substrate according to the above-described embodiment, alignment of the package 10 is made as follows. Other steps are similar to those in the method of manufacturing a photoelectric composite substrate according to the above-described embodiment.

Figure 13:
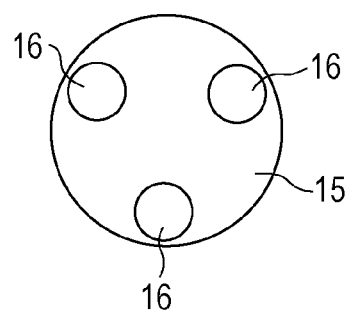
FIG. 13 is an example of a top view illustrating a positional relationship between contact terminals and a position detection member when the package used in the first modification is in a predetermined position.
Figure 14:
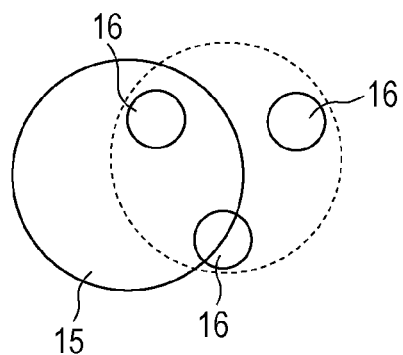
FIG. 14 is an example of a top view illustrating a positional relationship between the contact terminals and the position detection member when the package used in the first modification is not in a predetermined position.

FIG. 13 is an example of a top view illustrating a positional relationship between the contact terminals 16 and the position detection member 15 when the package 30 used in the first modification is in a predetermined position. FIG. 14 is an example of a top view illustrating a positional relationship between the contact terminals 16 and the position detection member 15 when the package 30 used in the first modification is not in a predetermined position. When the package 30 is in a predetermined position, for example, all the contact terminals 16 provided corresponding to a particular position detection member 15 are in contact with the particular position detection member 15 as illustrated in FIG. 13. On the other hand, when the package 30 is not in a predetermined position, for example, one or some of the contact terminals 16 provided corresponding to a particular position detection member 15 are not in contact with the particular position detection member 15 as illustrated in FIG. 14. Thus, when the package 30 is aligned, whether or not the package 30 is in a predetermined position may be checked by detecting with a detector circuit presence of electrical connection between the particular position detection member 15 and all the contact terminals 16 provided corresponding to the particular position detection member 15. When the package 30 is mounted, an electrical connection failure between the package 30 and the optical element 2 may be avoided by checking a conduction state between each contact terminal 16 and the position detection member 15.

As illustrated in FIG. 12, in the interposer 21 used in the first modification, in order to avoid connection failure between the position detection member 15 and the contact terminals 16, the solder balls 3 do not come into contact with the electrodes 11 even in a state where the position detection member 15 and the contact terminals 16 are in contact with each other. Thus, when the package 30 is mounted, the package 30 is pressed against the interposer 21 while avoiding horizontal displacement of the package 30, so that the solder balls 3 are welded to the electrodes 11.

By the method of manufacturing a photoelectric composite substrate according to the first modification, alignment of the package 30 may be easily made, and thus an electrical connection failure between the package 30 and the optical element 2 may be avoided.

Figure 15:
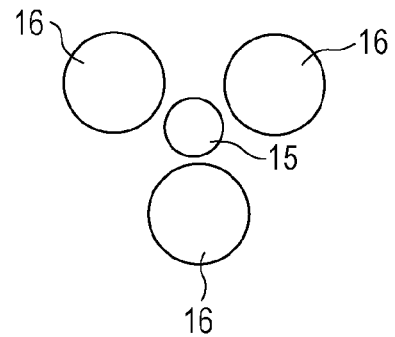
FIG. 15 is an example of a top view illustrating a positional relationship between the contact terminals and the position detection member when a package used in a second modification is in a predetermined position.
Figure 16:
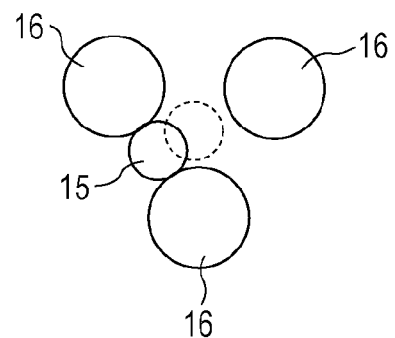
FIG. 16 is an example of a top view illustrating a positional relationship between the contact terminals and the position detection member when the package used in the second modification is not in a predetermined position.

The interposer and the package used in the first modification may be, for example, those illustrated below. FIG. 15 is an example of a top view illustrating a positional relationship between the contact terminals 16 and the position detection member 15 when the package 30 used in the second modification is in a predetermined position, the second modification being further modified from the first modification. FIG. 16 is an example of a top view illustrating a positional relationship between the contact terminals 16 and the position detection member 15 when the package 30 used in the second modification is not in a predetermined position. In the second modification, when the package 30 is in a predetermined position, for example, all the contact terminals 16 provided corresponding to the particular position detection member 15 surround the particular position detection member 15 as illustrated in FIG. 15, and any of the contact terminals 16 is not in contact with the position detection member 15. In the second modification, when the package 30 is not in a predetermined position, for example, some of the contact terminals 16 provided corresponding to the particular position detection member 15 may be in contact with the particular position detection member 15 as illustrated in FIG. 16. Thus, when the package 30 is aligned, whether or not the package 30 is in a predetermined position may be checked by detecting with a detector circuit presence of electrical connection between the particular position detection member 15 and all the contact terminals 16 provided corresponding to the particular position detection member 15.

Figure 17:
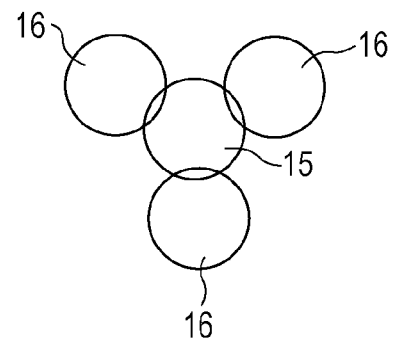
FIG. 17 is an example of a top view illustrating a positional relationship between the contact terminals and the position detection member when a package used in a third modification is in a predetermined position.
Figure 18:
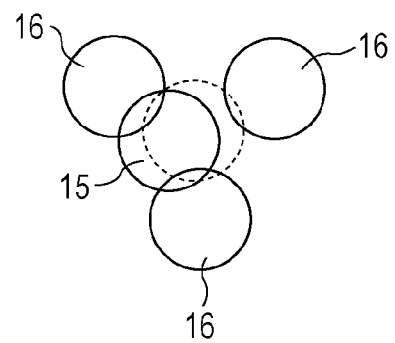
FIG. 18 is an example of a top view illustrating a positional relationship between the contact terminals and the position detection member when the package used in the third modification is not in a predetermined position.

The interposer and the package used in the first modification may be, for example, those illustrated below. FIG. 17 is an example of a top view illustrating a positional relationship between the contact terminals 16 and the position detection member 15 when the package 30 used in a third modification is in a predetermined position, the third modification being further modified from the first modification. FIG. 18 is an example of a top view illustrating a positional relationship between the contact terminals 16 and the position detection member 15 when the package 30 is not in a predetermined position. In the third modification, when the package 30 is in a predetermined position, for example, all the contact terminals 16 provided corresponding to the particular position detection member 15 surround the particular position detection member 15 as illustrated in FIG. 17, and any of the contact terminals 16 is in contact with the position detection member 15. In the third modification, when the package 30 is not in a predetermined position, for example, one of the contact terminals 16 provided corresponding to the particular position detection member 15 is not in contact with the particular position detection member 15 as illustrated in FIG. 18. Thus, when the package 30 is aligned, whether or not the package 30 is in a predetermined position may be checked by detecting with a detector circuit presence of electrical connection between the particular position detection member 15 and all the contact terminals 16 provided corresponding to the particular position detection member 15.

The first to third modifications described above may be similarly applied to not only the case where the optical element 2 is electrically connected to the package 30, but also the case, for example, where the optical element 2 is electrically connected to the printed circuit board 8.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of manufacturing a photoelectric composite substrate, the method comprising:
    aligning and fixing an optical element having an optical axis pointing to an optical waveguide and a solder terminal to the optical waveguide for forming a path of an optical signal so that the optical axis of the optical element intersects the optical waveguide;
    mounting the optical waveguide, to which the optical element is fixed, on a printed circuit board; and
    welding the solder terminal to an electrode of a package installed on the printed circuit board or an electrode of the printed circuit board.

2. The method of manufacturing a photoelectric composite substrate according to claim 1,
    wherein light is emitted with the optical element aligned with the optical waveguide and the optical element is fixed to the optical waveguide with a light curing resin which is cured by the light.

3. The method of manufacturing a photoelectric composite substrate according to claim 1,
    wherein the optical element includes a position detection member configured to change conduction states between a plurality of contact terminals provided in the package or the printed circuit board and the position detection member according to a relative positional relationship of the solder terminal with respect to the electrode of the package or the electrode of the printed circuit board, and the aligned optical element is fixed to the optical waveguide based on the conduction states between the contact terminals and the position detection member.

4. The method of manufacturing a photoelectric composite substrate according to claim 1,
    wherein a space between the optical element and the optical waveguide is filled with a resin which has an approximately the same refractive index as a refractive index of the optical waveguide.

5. A method of manufacturing a photoelectric composite substrate, the method comprising:
    aligning and fixing an optical element having an optical axis pointing to an optical waveguide and a solder terminal to the optical waveguide for forming a path of an optical signal after forming the solder terminal on the optical element so that the optical axis of the optical element intersects the optical waveguide;
    mounting the optical waveguide, to which the optical element is fixed, on a printed circuit board; and
    welding the solder terminal to an electrode of a package installed on the printed circuit board or an electrode of the printed circuit board.

* * * * *